United States Patent [19]

Bloor et al.

[11] Patent Number: 4,934,472
[45] Date of Patent: Jun. 19, 1990

[54] POWER ASSISTED STEERING SYSTEM FOR A MOTOR VEHICLE AND CONTROL MEANS THEREFOR

[75] Inventors: Paul C. Bloor; Jonathan A. Fuller, both of Warwick, England

[73] Assignee: Austin Rover Group Limited, Coventy, England

[21] Appl. No.: 336,337

[22] Filed: Apr. 11, 1989

[30] Foreign Application Priority Data

May 16, 1988 [GB] United Kingdom ............... 8811018

[51] Int. Cl.⁵ ............................................. B62D 5/04
[52] U.S. Cl. .................................... 180/79.1; 310/190
[58] Field of Search ............... 180/79.1; 310/156, 190; 318/254

[56] References Cited

U.S. PATENT DOCUMENTS

| | | | |
|---|---|---|---|
| 2,754,465 | 7/1956 | Brier | 318/488 |
| 3,493,831 | 2/1970 | Roberts | 310/190 |
| 3,529,220 | 9/1970 | Kobayashi | 318/254 |
| 3,906,267 | 9/1975 | Coupin et al. | 310/156 |
| 4,582,155 | 4/1986 | Ohe | 180/79.1 |
| 4,667,123 | 5/1987 | Denk et al. | 310/156 |
| 4,753,309 | 6/1988 | Marumoto et al. | 180/79.1 |

FOREIGN PATENT DOCUMENTS

| | | | |
|---|---|---|---|
| 0207604 | 7/1947 | European Pat. Off. | |
| 0125918 | 7/1986 | European Pat. Off. | |
| 0189172 | 7/1986 | European Pat. Off. | |
| 0012460 | 1/1987 | Japan | 180/79.1 |
| 0279172 | 12/1987 | Japan | 180/79.1 |
| 2193696 | 2/1988 | United Kingdom | |
| 2161030 | 5/1988 | United Kingdom | |

*Primary Examiner*—Charles A. Marmor
*Assistant Examiner*—Wook Yoon
*Attorney, Agent, or Firm*—Thomas J. Greer, Jr.

[57] ABSTRACT

A power assisted steering system which utilizes a brushless electric motor having a rotor and a wound stator. The rotor is directly connected to the steering shaft 12 rotated by a driver of the vehicle, and is formed by a number of permanent magnets secured in respective recesses on the steering shaft. The controller 17 associated with the steering system is arranged to switch off the motor 15 above a pre-determined vehicle speed.

5 Claims, 11 Drawing Sheets

MAIN EXECUTIVE ROUTINE

ROAD SPEED CALCULATION

CALCULATE ASSISTANCE TORQUE PT1

CALCULATE ASSISTANCE TORQUE PT2

CALCULATE ASSISTANCE TORQUE PT3

OUTPUT ASSISTANCE TORQUE PT1

OUTPUT ASSISTANCE TORQUE PT2

OUTPUT ASSISTANCE TORQUE PT3

POWER ASSISTED STEERING SYSTEM FOR A MOTOR VEHICLE AND CONTROL MEANS THEREFOR

This invention relates to a power assisted steering system for a motor vehicle and in particular to a system in which the assistance is provided by an electric motor and the control means therefor.

It is known to provide for example from GB No. 2130537 a power assisted steering system for a motor vehicle in which the assistance is supplied by an electric motor. Such a system is particularly advantageous with respect to the hydraulic type of power assisted steering systems for the reasons set forth in GB No. 2130537.

In the system as set forth in GB No. 2130537 the electric motor is mechanically coupled to a movable part of the steering actuation means by a reduction gear. The electric motor is energised by a control means below a pre-determined speed to supply an assisting torque to the movable part of the steering actuation means in response to a sensed torque and to cease supplying an assisting torque above the pre-determined speed.

It is an object of this invention to provide a power assisted steering system of compact design and of simpler construction.

According to the invention there is provided a power assisted steering system for a motor vehicle having at least one steerable road wheel, the system comprising a steering shaft manually rotatable by a driver of the vehicle, a steering mechanism to convert rotation of the steering shaft into steering movement of the or each steerable road wheel, an electric motor having a rotor and a wound stator encircling the rotor, a torque sensor to provide a signal indicative of the torque difference between the torque applied to the steering shaft by a driver of the vehicle rotating the steering shaft and the assistance torque applied by the electric motor to the steering shaft and, control means to supply a control signal to the electric motor in response to the signal received from the torque sensor wherein the electric motor is a brushless electric motor having a number of permanent magnets connected to part of the steering shaft for rotation therewith to form the rotor.

This has the advantage that the system is very compact.

The power assisted steering system may include vehicle speed sensor means operable to send a speed signal indicative of vehicle speed to the control means.

Advantageously, the control means is arranged to supply the control signal to the electric motor to energise the stator only when the speed signal received from the speed sensor indicates that the vehicle speed is below a pre-determined speed.

This has the advantage that the frequency response required of the motor and its associated control means is lower than with a full time power assist system.

Advantageously, each of the permanent magnets is connected to the steering shaft by being press fitted into a recess in the steering shaft where it is secured by adhesive bonding.

This has the advantage that the properties of the magnets are not affected in any way by the process of connection to the steering shaft.

Preferably, each of the permanent magnets is a Neodymium-Iron-Boron permanent magnet.

This has the advantage that the motor has a very high specific power output.

The invention will now be described by way of example with reference to the accompanying drawing of which:

Figure 1:
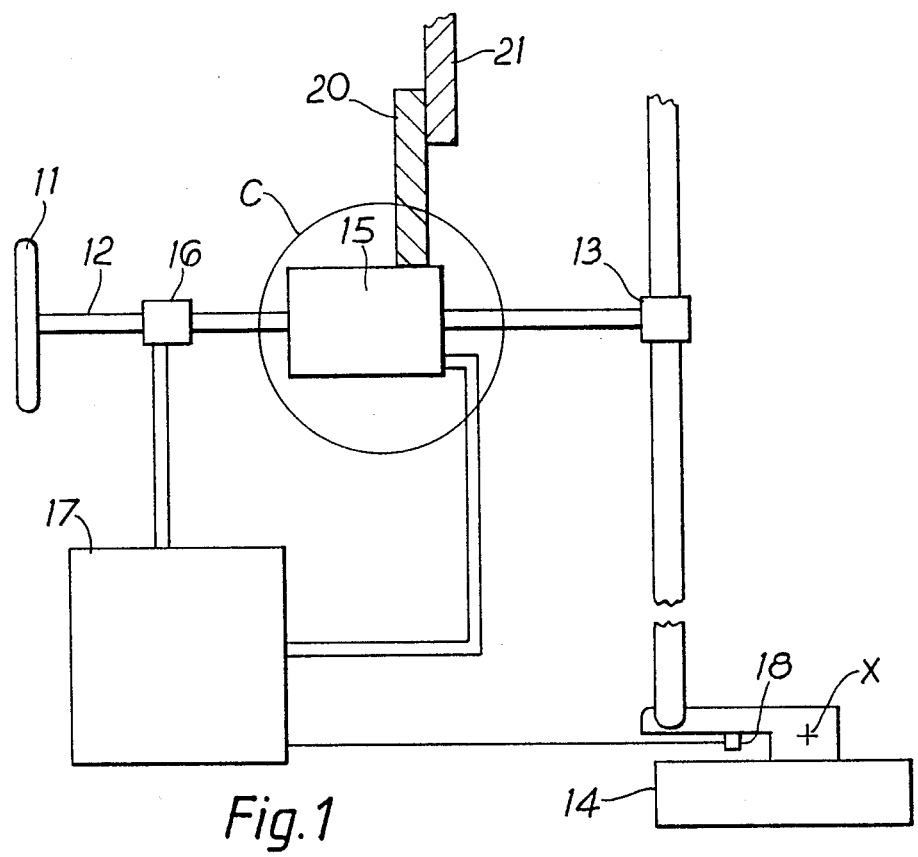
FIG. 1 is a schematic illustration of a power assisted steering system according to the invention.

With reference to FIG. 1 there is shown a power assisted steering system for a motor vehicle. The system comprises a steering wheel 11 connected to a steering shaft 12, a steering mechanism in the form of a rack and pinion steering box 13, an electric motor 15 driveably connected to the steering shaft 12, a torque sensor 16 to provide a signal indicative of the torque difference between the torque applied to the steering shaft 12 by a driver of the vehicle rotating the steering wheel 11 and the torque applied by the electric motor 15, a speed sensor means in the form of an inductive pick up 18 operatively connected to one of the steerable wheels 14 of the motor vehicle and at least one hall effect sensor 28 associated with the motor 15 used to sense the rotational position of the rotor.

Figure 2:
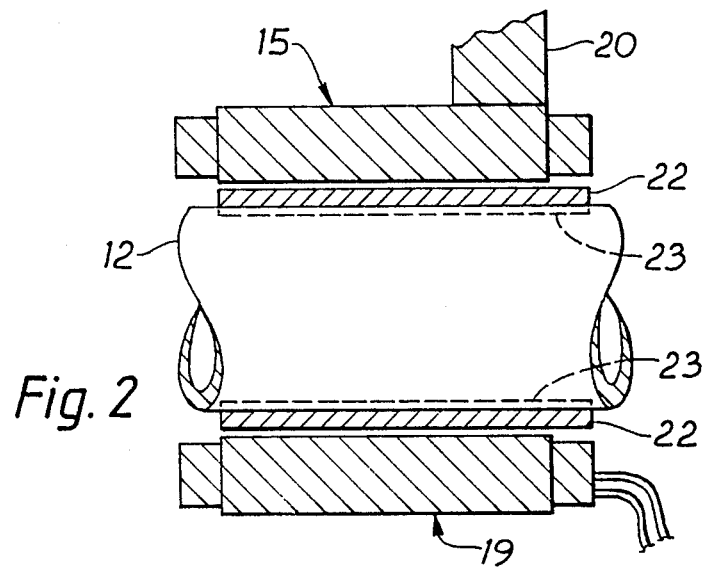
FIG. 2 is an enlarged view of the area bounded on its outer periphery by the circle C on FIG. 1.
Figure 3:
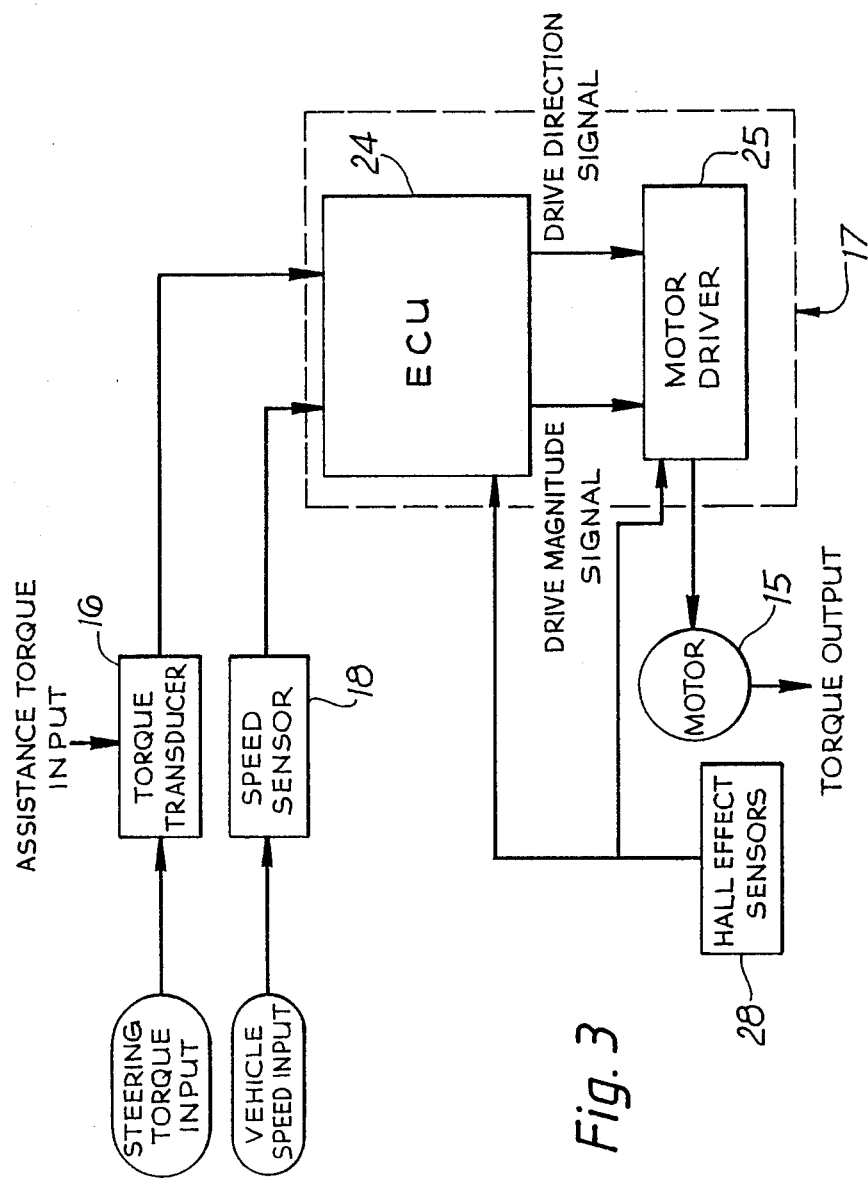
FIG. 3 is a flow diagram for the power assisted steering system according to the invention.

The electric motor 15 has a wound stator 19 which is prevented from rotation by a bracket 20 fixed to part of the framework of the vehicle in this case front bulkhead 21. As can be seen by particular reference to FIG. 2 the rotor of the electric motor 15 comprises a number of rare earth Neodymium-Iron-Boron permanent magnets 22 connected to the steering shaft 12 encircled by the stator 19. Each of the magnets 22 is press fitted into a respective recess 23 in the steering shaft 12 and is further secured by being adhesively bonded in place.

The steering box 13 is connected to the steerable wheels 14 (only one of which is shown) of the vehicle and is operable to cause rotation of the wheels 14 in a direction to produce a steering effect on the vehicle in response to a rotational input imparted by the steering shaft 12 in the normal manner.

The control means 17 includes an electronic control unit 24 to receive data from the torque sensor 16, speed sensor 18 and the hall effect sensors 28, and a motor drive unit 25. The motor drive unit 25 is operable to convert a command signal from the electronic control unit 24 into a control signal of sufficient voltage and current to energise the stator 19.

Operation of the power assisted system is as follows.

With the vehicle stationary rotation of the steering wheel 11 in either direction will produce a torque in the steering shaft 12 which is sensed by the torque-sensor 16. The torque sensor 16 supplies a signal indicative of the magnitude and direction of this torque to the electronic control unit 24. Simultaneously, signals are sent from the speed sensor 18 and the hall effect sensor 28 to the electronic control unit 24.

Figure 5:
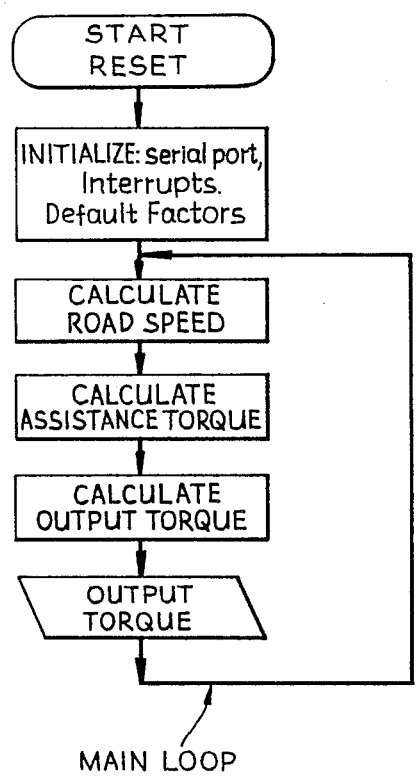
FIG. 5 is a block diagram of the main executive routine executed by the electronic control unit.

The electronic control unit 24 processes the signals received from the sensors 16,18,28 in four distinct stages as shown on FIG. 5.

Figure 6:
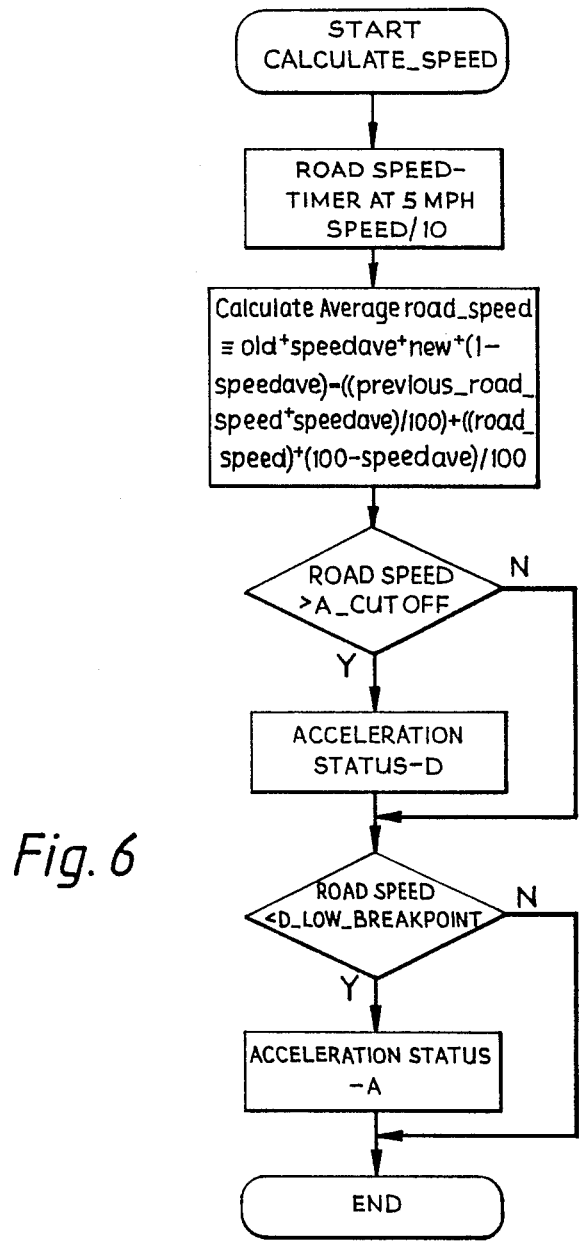
FIG. 6 is a block diagram of the calculate road speed routine of FIG. 5.
Figure 7:
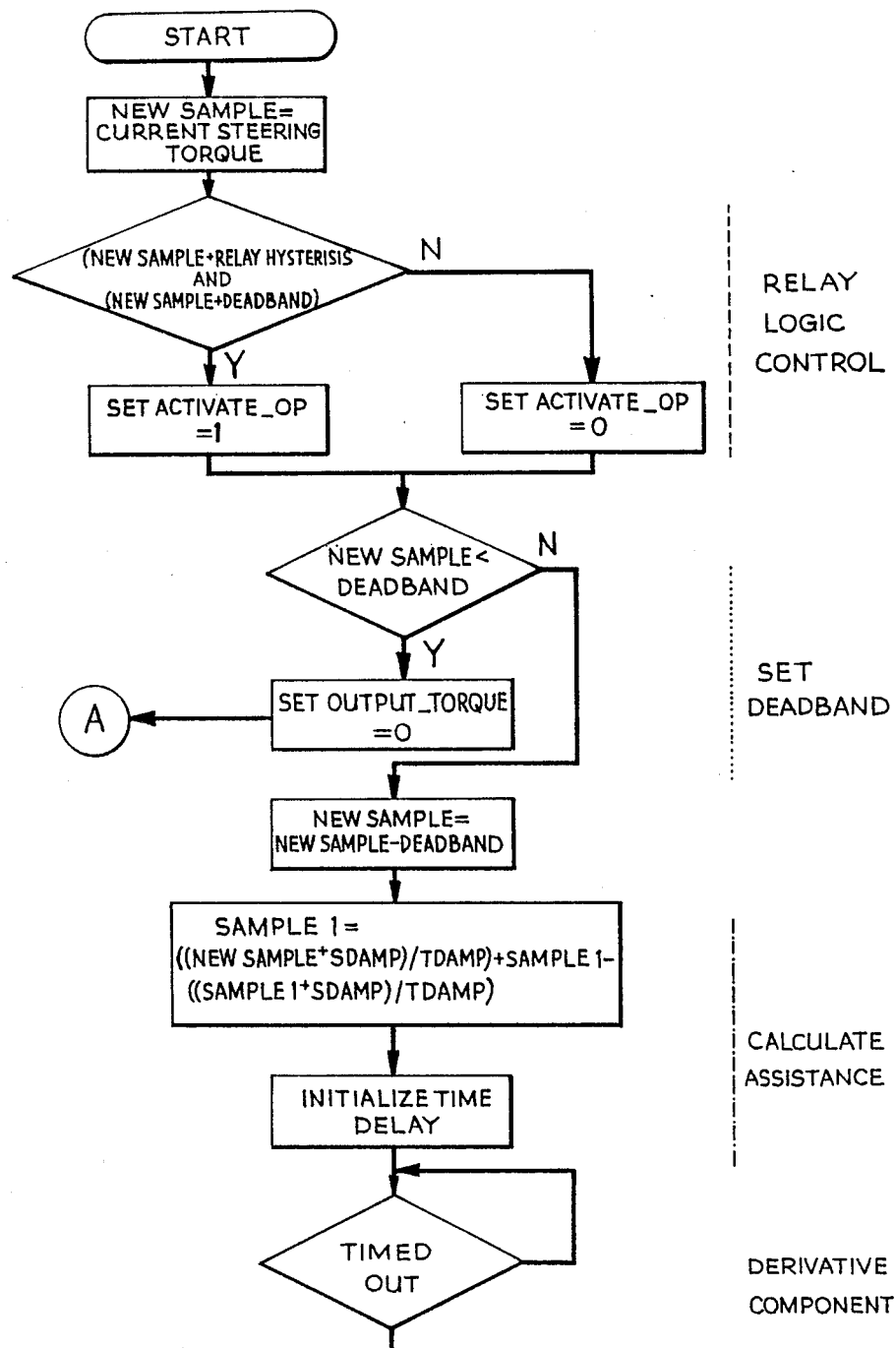
FIGS. 7, 8 and 9 are a block diagram of the calculate assistance torque routine of FIG. 5.
Figure 8:
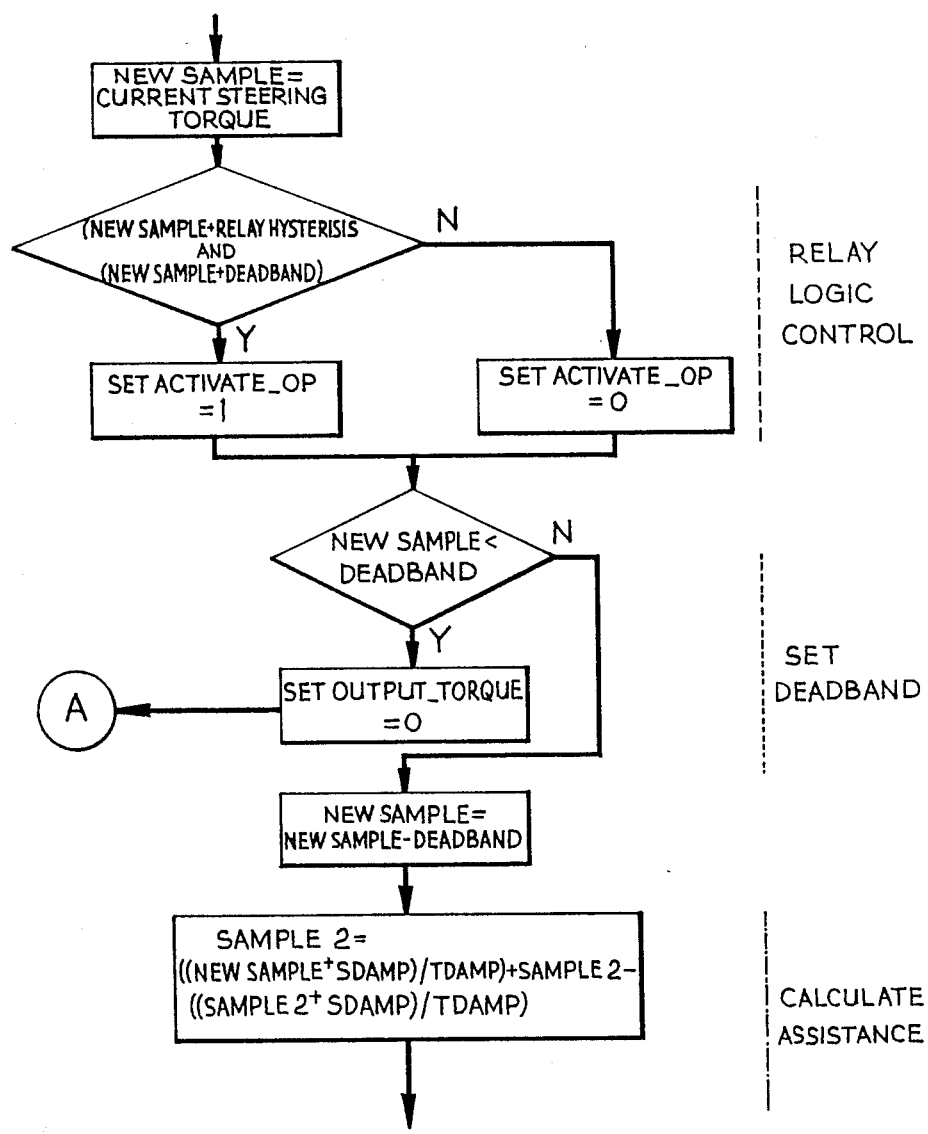
Figure 9:
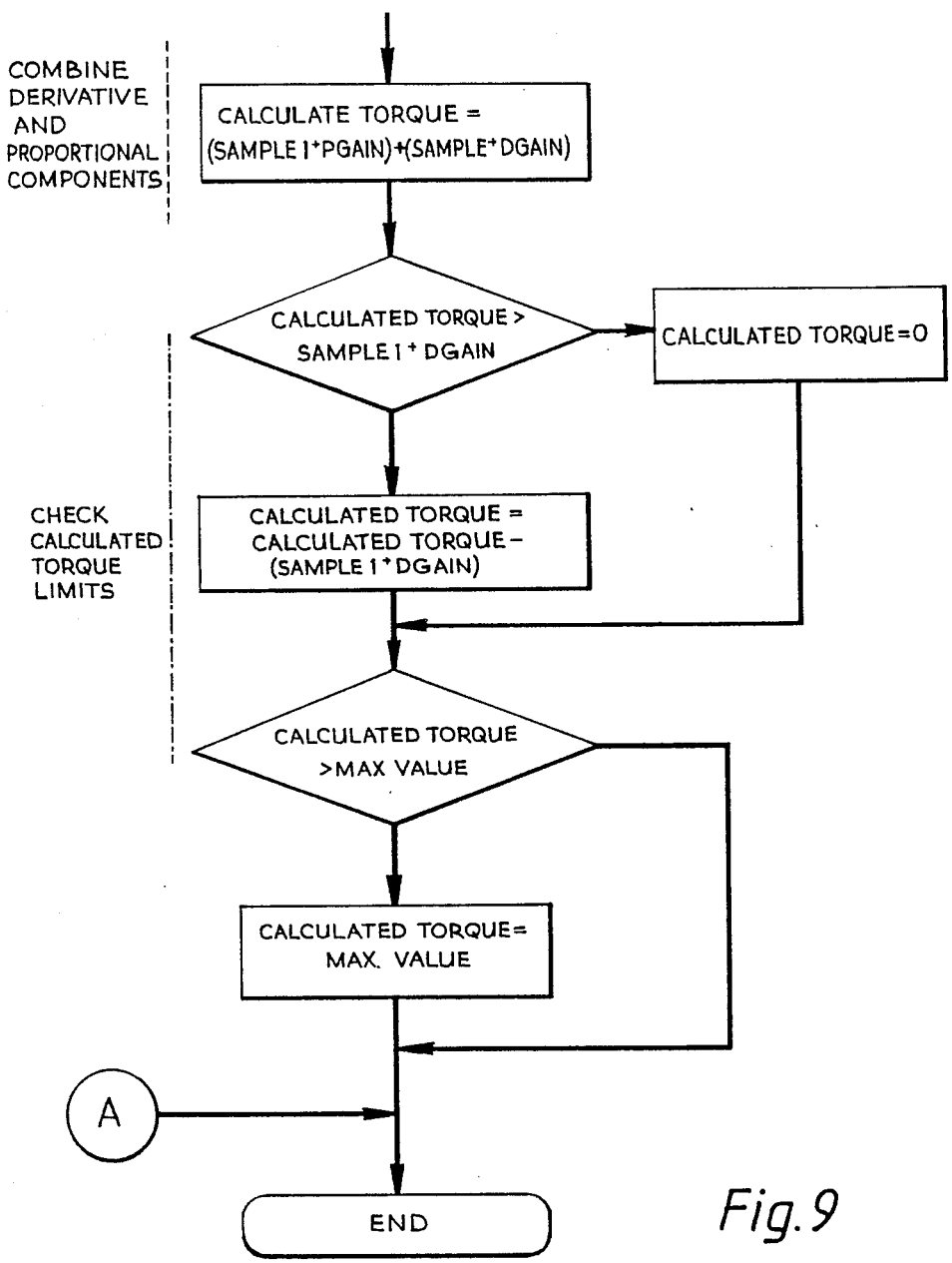

On entering the calculate road speed routine shown in FIG. 6 the first stage is to calculate from the signal received from the speed sensor 18 the vehicle speed and whether this is increasing or decreasing. A speed flag is set to indicate whether the vehicle is accelerating or decelerating. The routine then returns to the main loop and enters the second stage called the assistance torque routine which is shown in detail in FIGS. 7, 8 and 9.

On entering this routine the torque signal as received from the torque sensor 16 is checked against a pre-determined absolute value of torque. This test is conducted for several reasons firstly to make the system fail-safe in the event of a failure of the torque sensor 16, secondly to prevent excessive torques being applied to the steering box 13 in the event of the steering reaching an end stop in either direction or any attempt to steer the wheels when one of the steerable wheels 14 is against a curb or other obstruction. If the absolute value of torque has been exceeded then a disable flag is set which disables the motor 15.

The next stage is to detect from the signal sent from the torque sensor 16 the direction and the magnitude of the torque.

Initially the direction of the torque is sensed and a torque direction flag is set.

To prevent hunting or instability within the system a deadband is provided and only if the torque signal exceeds the limits of this deadband will further computation take place. If the limits of the deadband are not exceeded then control reverts to the main loop and the preceding stages are started again. To calculate the assistance level two measurements of the signal from the torque sensor 16 are used separated by a finite delay.

In each case the deadband is subtracted from the signals so that the driver always feels the same torque level while the system is operative.

The assistance level is then calculated in the following manner:

Assist level=T1*PG+(T2−T1)*DG where;
T1=(first torque signal−deadband)
T2=(second torque signal−deadband)
PG=Proportional gain
DG=Derivative gain.

Figure 10:
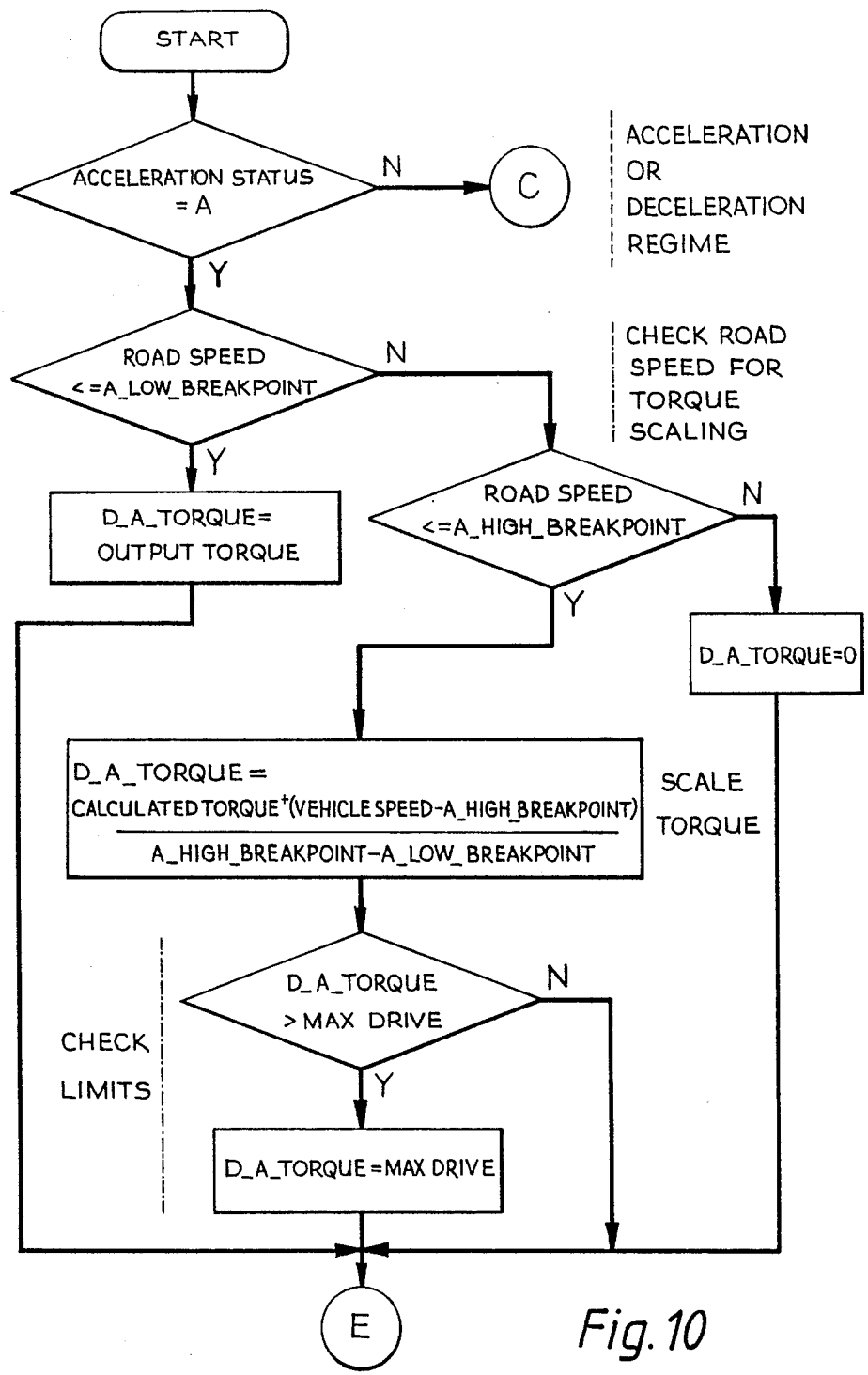
FIGS. 10, 11 and 12 are a block diagram of the calculate output torque routine of FIG. 5.
Figure 11:
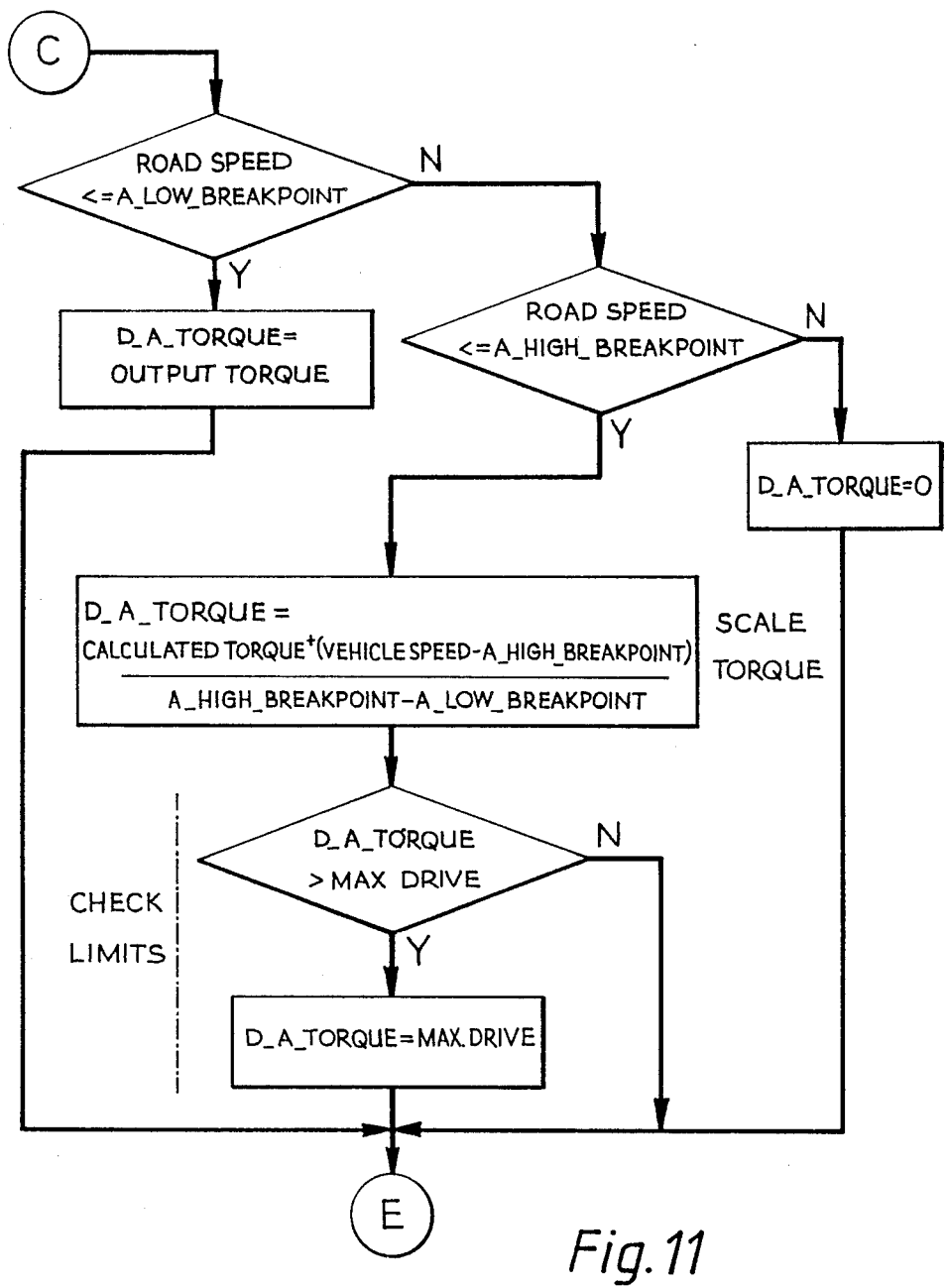
Figure 12:
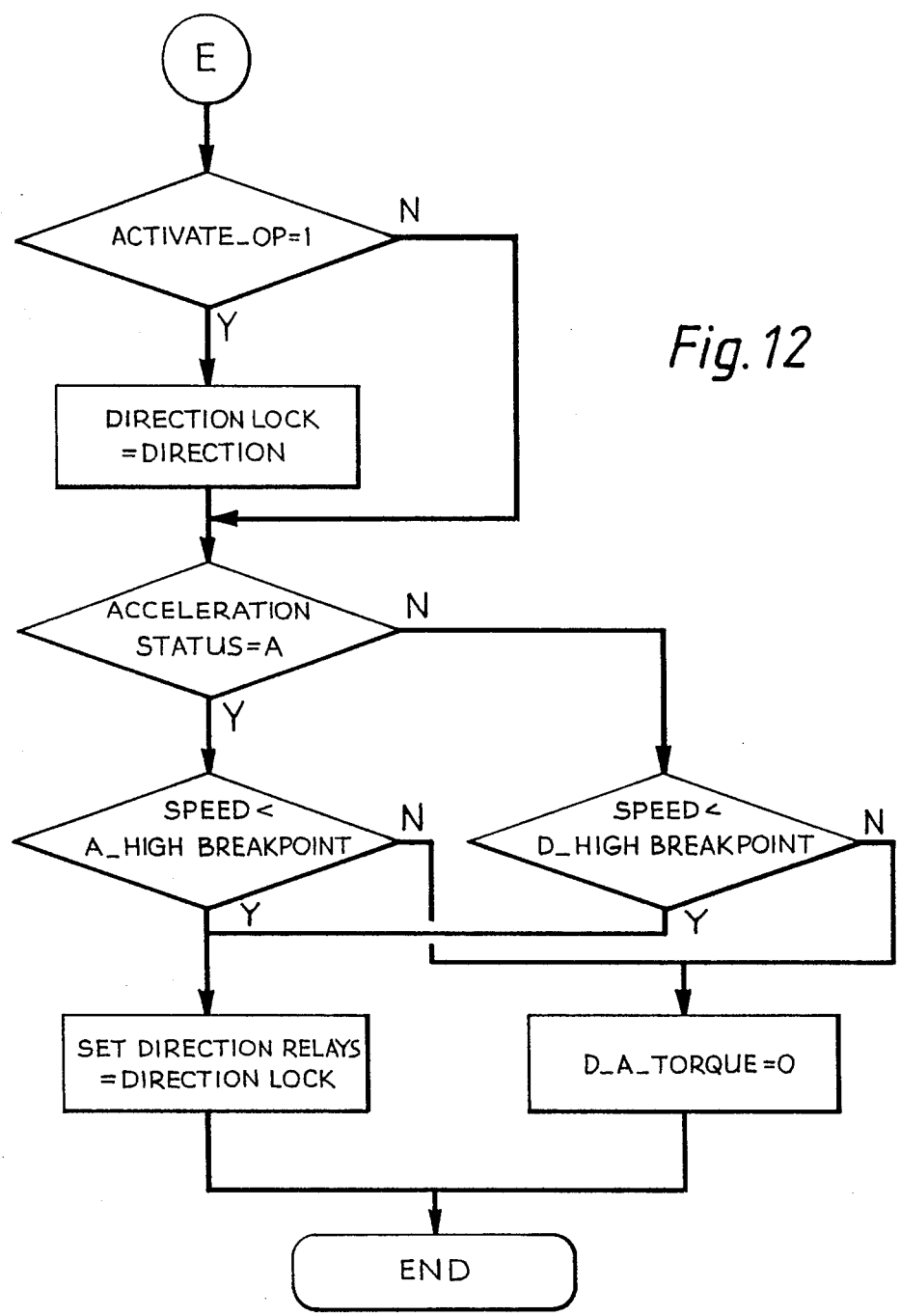

Finally the value of assistance torque as calculated above is checked to ensure it does not exceed pre set system parameters and if it does not exceed these parameters then control is returned to the main loop and the next stage is entered which is the calculate output torque routine, shown in FIGS. 10, 11 and 12.

Figure 4:
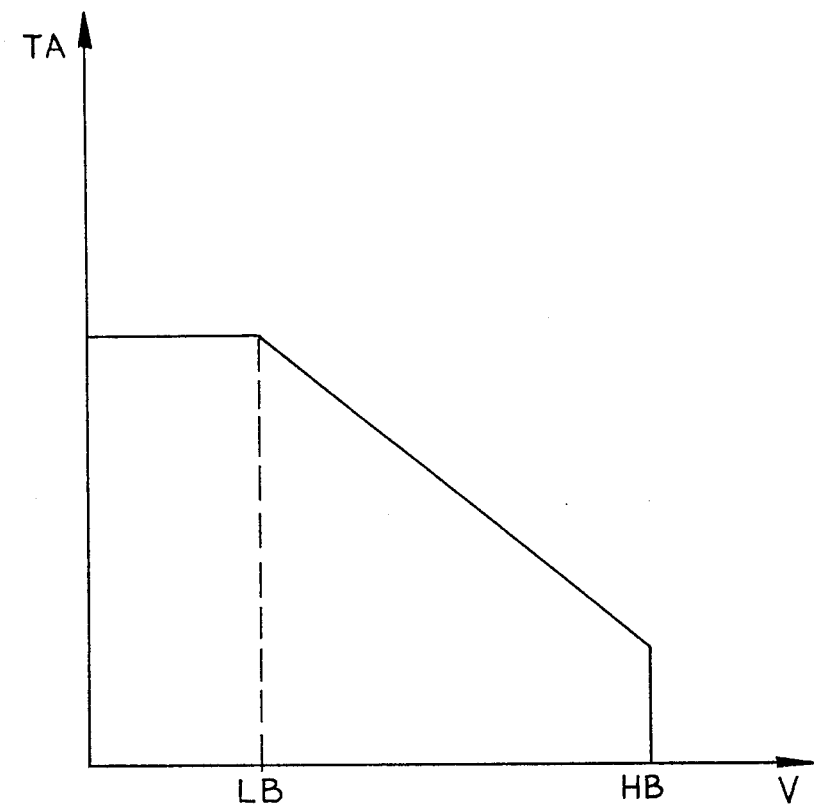
FIG. 4 is a graph showing a typical relationship between torque magnifier TA and vehicle speed V.

In the calculate output torque routine the assistance torque as calculated in the calculate assistance torque routine is modified by multiplying it by a torque magnifier in the manner shown in FIG. 4. The effect of this is that above a pre-determined speed known as the high breakpoint HB no assistance will be provided and below a pre-determined speed known as the low breakpoint LB full assistance as calculated in the calculate assistance torque routine is provided there being a transition in between these speeds.

Upon entering the calculate output torque routine the first step is to read the speed flag as set in the calculate road speed routine depending upon the value of this flag different values of high and low breakpoint are selected and the relationship between assistance torque magnifier and speed as shown in FIG. 4 is therefore different depending upon whether the vehicle is accelerating or decelerating. Once the value of output assistance torque has been calculated control then reverts to the main loop and the final routine known as the output torque routine is entered.

In the output routine the output assistance torque as calculated in the calculate output torque routine is converted into a command signal for the motor driver unit 25 and combined with the torque direction flag to provide a command signal indicative of the magnitude and direction of the required assistance torque to be supplied by the motor 15.

The motor driver unit 25 responds to the command signal received from the electronic control unit 24 by sending a control signal to the electric motor 15. The control signal sent to the electric motor 15 is of sufficient voltage and current to produce the required assistance torque.

The output from the hall effect sensors 28 is used by the motor driver unit 25 to detect where the rotor is relative to the stator 19. This feedback from the hall effect sensors 28 is used by the motor driver unit 25 to decide which winding to energise to produce the demanded direction of rotation.

Above the pre-determined high breakpoint HB the steering acts exactly as if no power assistance is available and the driver experiences the same weight and feed as with a manual steering system there being virtually no drag on the system from the disabled motor 15.

Although the torque magnifier relationship as shown in FIG. 4 is essentially a ramp relationship ending with a step at the high breakpoint HB it will be appreciated that the electronic control unit 24 may be arranged to gradually reduce the amount of assistance provided as the pre-determined speed is approached to provide a smooth transition from the assisted to the non-assisted modes.

It will be appreciated by a person skilled in the art that the invention is not limited to the specific embodiment hereinbefore described.

The rotor of the electric motor for example could be incorporated in a tubular shield for the steering shaft, such shields being commonly known as steering columns.

We claim:

1. A power assisted steering system for a motor vehicle having at least one steerable road wheel, the system comprising:
   a steering shaft manually rotatable by a driver of the vehicle;
   a steering mechanism to convert rotation of the steering shaft into steering movement of the or each steerable road wheel;
   an electric motor having a rotor and a wound stator encircling the rotator;
   a torque sensor to provide a signal indicative of the torque difference between the torque applied to the steering shaft by a driver of the vehicle rotating the steering shaft and the assistance torque applied by the electric motor to the steering shaft and
   control means to supply a control signal to the electric motor in response to the signal received from the torque sensor wherein the electric motor is a brushless electric motor having a number of permanent magnets connected to part of the steering shaft for rotation therewith to form the rotor, each of the permanent magnets connected to a part of the steering shaft by being press fitted into a respective recess in the steering shaft.

2. A power assisted steering system for a motor vehicle as claimed in claim 1 in which the power assisted steering system includes vehicle speed sensor means operable to send a speed signal indicative of vehicle speed to the control means.

3. A power assisted steering system for a motor vehicle as claimed in claim 2 in which the control means is arranged to supply the control signal to the electric motor to energise the stator only when the speed signal received from the speed sensor indicates that the vehicle speed is below a pre-determined speed.

4. A power assisted steering system for a motor vehicle as claimed in claim 1 in which each of the permanent magnets is further connected to the steering shaft by adhesive bonding.

5. A power assisted steering system for a motor vehicle as claimed in claim 1 in which each of the permanent magnets is a Neodymium-Iron-Boron permanent magnet.

* * * * *